(12) United States Patent
Trsar et al.

(10) Patent No.: US 7,010,460 B2
(45) Date of Patent: Mar. 7, 2006

(54) RECIPROCATING ENGINE CYLINDER CONTRIBUTION TESTER AND METHOD

(75) Inventors: Dale A. Trsar, Mt. Prospect, IL (US); Lee M. Snorteland, San Jose, CA (US); Kenneth A. McQueeney, Los Gatos, CA (US); Thomas D. Loewe, Wonder Lake, IL (US)

(73) Assignee: Snap-On Incorporated, Pleasant Prairie, WI (US)

( * ) Notice: Subject to any disclaimer, the term of this patent is extended or adjusted under 35 U.S.C. 154(b) by 2 days.

(21) Appl. No.: 10/695,806

(22) Filed: Oct. 30, 2003

(65) Prior Publication Data

US 2005/0096868 A1     May 5, 2005

(51) Int. Cl.
  *G06F 19/00*   (2006.01)
  *G01L 25/00*   (2006.01)
(52) U.S. Cl. .................. 702/182; 73/35.01; 73/116; 73/117.1; 702/33
(58) Field of Classification Search ............... 73/35.01, 73/116, 117.1, 119 R; 702/182, 33, 41, 42, 702/117; 123/406.11, 406.13, 406.17
See application file for complete search history.

(56) References Cited

U.S. PATENT DOCUMENTS

| | | | |
|---|---|---|---|
| 3,503,256 A | | 3/1970 | List et al. |
| 3,771,047 A | | 11/1973 | Spengler et al. |
| 3,982,193 A | | 9/1976 | Maringer |
| 4,379,990 A | | 4/1983 | Sievers et al. |
| 4,812,979 A | | 3/1989 | Hermann et al. |
| 4,843,870 A | * | 7/1989 | Citron et al. .................. 73/116 |
| 5,004,979 A | | 4/1991 | Marino et al. |
| 5,041,980 A | * | 8/1991 | Maddock et al. ........... 701/101 |
| 5,087,881 A | | 2/1992 | Peacock |
| 5,132,909 A | * | 7/1992 | Schroeder et al. ........... 701/101 |
| 5,241,480 A | | 8/1993 | Takaku et al. |
| 5,258,753 A | * | 11/1993 | Jonker et al. ............ 345/440.2 |
| 5,396,427 A | * | 3/1995 | Piehl et al. .................. 701/102 |
| 5,400,648 A | * | 3/1995 | Mahr ........................... 73/115 |
| 5,446,664 A | * | 8/1995 | Vossen et al. .............. 701/101 |
| 5,515,712 A | * | 5/1996 | Yunick ............................ 73/9 |
| 5,524,480 A | | 6/1996 | Schlienz et al. |
| 5,592,386 A | * | 1/1997 | Gaultier ....................... 701/99 |
| 5,663,493 A | | 9/1997 | Gerbert et al. |
| 5,709,192 A | * | 1/1998 | Zimmermann .............. 123/436 |
| 5,978,727 A | | 11/1999 | Jones et al. |
| 5,987,974 A | * | 11/1999 | Lewis et al. .................. 73/116 |
| 6,273,064 B1 | * | 8/2001 | Scholl et al. .......... 123/406.24 |
| 6,388,444 B1 | * | 5/2002 | Hahn et al. ................. 324/378 |
| 6,510,732 B1 | * | 1/2003 | Liang et al. ............... 73/117.3 |

(Continued)

FOREIGN PATENT DOCUMENTS

EP         0 408 877 B1    1/1991

(Continued)

*Primary Examiner*—Patrick J. Assouad
(74) *Attorney, Agent, or Firm*—McDermott Will & Emery LLP

(57) ABSTRACT

Engine cylinder contribution analysis is provided. An engine cylinder contribution tester includes a displacement measurement device and a signal analyzer. The displacement measurement device detects engine block movements or displacement relative to a fixed position caused by a poorly contributing cylinder. The displacement measurement device provides a displacement signal to the signal analyzer. The signal analyzer includes a cylinder contribution module for evaluating the displacement signal. If a particular cylinder is contributing less than the average of the other cylinders, the displacement signal indicates engine block movement associated with a lack of contribution from that cylinder.

4 Claims, 8 Drawing Sheets

U.S. PATENT DOCUMENTS

| | | |
|---|---|---|
| 6,711,944 B1 * | 3/2004 | Maruta et al. ................. 73/116 |
| 2002/0007668 A1 * | 1/2002 | Maruta et al. ................. 73/116 |
| 2002/0116115 A1 * | 8/2002 | Volpe et al. ................. 701/114 |
| 2003/0060963 A1 * | 3/2003 | Volpe et al. ................. 701/104 |
| 2003/0079528 A1 * | 5/2003 | Wittliff ........................ 73/116 |
| 2003/0236609 A1 * | 12/2003 | Daniel et al. ............... 701/102 |
| 2003/0236611 A1 * | 12/2003 | James et al. ................ 701/111 |
| 2004/0125378 A1 * | 7/2004 | Selbach et al. ............. 356/496 |
| 2004/0236494 A1 * | 11/2004 | DeBotton et al. ........... 701/111 |

FOREIGN PATENT DOCUMENTS

EP  0 494 171 B1  7/1992

* cited by examiner

RECIPROCATING ENGINE CYLINDER CONTRIBUTION TESTER AND METHOD

TECHNICAL FIELD

The present disclosure relates generally to engine diagnostics, and more particularly, to evaluating cylinder contribution to engine output power.

BACKGROUND

Engine performance problems are typically caused by the failure or diminished operation of a single control system or single engine cylinder. Many conventional diagnostic instruments are designed for testing or troubleshooting various systems, including the ignition, induction, electrical, and emissions systems. One problem with conventional diagnostic instruments is that they often require complicated or time-consuming connections to the engine. Further, conventional diagnostic instruments may display results that are difficult to interpret or provide only general information. That is, a technician may invest time setting up a diagnostic instrument yet not receive specific enough information about a problem or performance issue to perform a repair efficiently.

In a properly functioning reciprocating engine, each cylinder contributes equally to the total output power for balanced operation. A lack of equal contribution to overall power typically produces an imbalance in the form of an unwanted engine block motion. That is, the lack of expected contribution from one or more cylinders can cause the engine to "rock" or displace with respect to the engine's normal, balanced motion on its mount points.

To evaluate engine cylinder contribution issues, typical diagnostic instruments infer the velocity of engine block movement from other measurements. One conventional technique measures the rate of change of alternator ripple and relates this to engine block movement.

One problem with inferring the velocity of engine block movement is the inaccuracy of the resulting information. In a typical belt-driven alternator system, for example, the belt does not move exactly with the engine. This makes it difficult to infer the engine block movement accurately from the alternator output current. Given that a performance problem is likely attributable to a malfunction of a single engine cylinder, a technician does not want to receive inaccurate information and, therefore, consume diagnostic or repair time on a properly functioning cylinder.

Additionally, common diagnostic instruments for evaluating an engine cylinder contribution may require the use of many pieces of equipment. For each piece of equipment, the technician must spend time setting it up and running the tests. Thus performing a comprehensive diagnostic test may require significant diagnostic time to localize or to pinpoint the specific trouble area.

What is needed is a diagnostic instrument for evaluating engine cylinder contribution that uses direct observation of engine block movements to provide specific results in an easily understandable manner.

SUMMARY OF THE DISCLOSURE

In one aspect, engine cylinder contribution is evaluated. A displacement measuring device, such as a potentiometer, observes engine block movement or displacement with respect to the engine mount points. The displacement measuring device provides a displacement signal to a signal analyzer. The signal analyzer evaluates the displacement signal to identify a low or poorly contributing cylinder.

In another aspect, a trigger signal provides a reference point for the signal analyzer. The trigger signal enables the signal analyzer to use the firing order or other engine parameters when analyzing the displacement signal. Further, the trigger signal enables a user interface module to provide specific test results in an easily understandable manner.

In a further aspect, a method for measuring cylinder contribution includes observing engine block movement with a displacement measuring device (e.g., a potentiometer or a piezo cable). The observed movement can be correlated to the engine's firing order and evaluated to determine the cylinder contribution. The lack of expected contribution from one or more cylinders can cause the engine to "rock" or displace with respect to the engine's normal, balanced motion on its mount points.

Additional aspects and advantages of the present disclosure will become readily apparent to those skilled in this art from the following detailed description, wherein only exemplary embodiments of the present disclosure is shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

The accompanying drawings illustrate several embodiments and, together with the description, serve to explain the principles of the present disclosure.

DETAILED DESCRIPTION OF THE EMBODIMENTS

The present disclosure is now described more fully with reference to the accompanying figures, in which several embodiments are shown. The embodiments described herein may include or be utilized with any appropriate engine having an appropriate voltage source, such as a battery, an alternator and the like, providing any appropriate voltage, such as about 12 Volts, about 42 Volts and the like. The embodiments described herein may be used with any desired system or engine. Those systems or engines may comprise items utilizing fossil fuels, such as gasoline, natural gas, propane and the like, electricity, such as that generated by battery, magneto, solar cell and the like, wind and hybrids or combinations thereof. Those systems or engines may be incorporated into other systems, such as an automobile, a truck, a boat or ship, a motorcycle, a generator, an airplane and the like.

One skilled in the art will recognize that methods, apparatus, systems, data structures, and computer readable media implement the features, functionalities, or modes of usage described herein. For instance, an apparatus embodiment can perform the corresponding steps or acts of a method embodiment.

A. System Overview

Figure 1A:
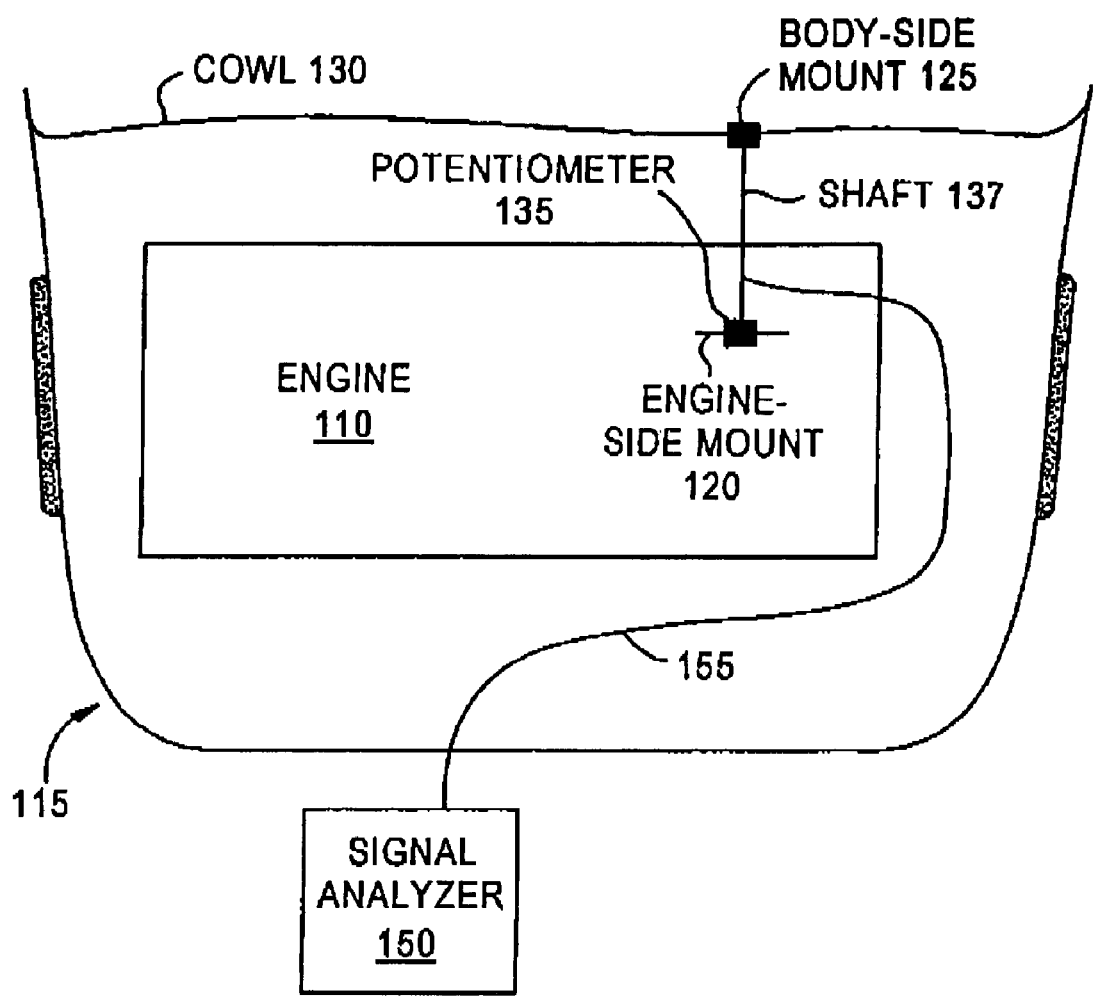
FIG. 1A illustrates an operating environment for an embodiment of the present disclosure.

FIG. 1 illustrates an operating environment for an embodiment of the present disclosure. The illustrated embodiment includes an engine 110, a potentiometer 135, and a signal analyzer 150. The engine 110 is shown mounted in a vehicle 115. One skilled in the art will appreciate that the engine 110 can be mounted in the vehicle 115 using a variety of conventional vibration dampening hardware, such as rubber engine mounts.

The signal analyzer 150 is coupled to the potentiometer 135 via a signal cable 155. In one embodiment, the signal cable 155 includes one or more wireline communications paths for communicating data between the potentiometer 135 and the signal analyzer 150. Various protocols or signaling techniques can be used with the signal cable 155. For example, the signal cable 155 can include an analog electrical signal (at baseband or any suitable transmission frequency). In addition, the displacement measuring device (e.g., the potentiometer 135) can include circuitry or logic for digitizing or for encoding the provided displacement signal into a data communication interface protocol. For example, typical serial data interfaces (e.g., RS-232, universal serial bus, or IEEE 1394), instrument interfaces (e.g., general purpose instrument bus) or onboard diagnostic system interfaces (e.g., OBD-II) can be used. In another embodiment, the displacement measuring device and the signal analyzer 150 can communicate or exchange data wirelessly. Radio frequency (RF) or infrared (IR) communications protocol can be used.

The potentiometer 135 includes a shaft 137 that is extendible from the potentiometer 135. The potentiometer 135 outputs a voltage difference signal that corresponds to movements of the shaft 137. In one embodiment, the potentiometer 135 is a conventional 2 inch stroke linear potentiometer (which is commercially available from Penny+Giles of Dorset, United Kingdom). The stroke of the potentiometer 135 generally refers to the distance that the shaft 137 may travel into or out of the body of the potentiometer 135.

In the illustrated configuration for measuring engine cylinder contribution, the potentiometer 135 is attached to the vehicle 115 between the engine 110 and the cowl 130. The cowl 130 is part of the body of the vehicle 115 and represents a stationary or fixed mount point with respect to movement (or displacement) of the engine 110. More specifically, the potentiometer 135 is mechanically attached to the engine 110 at an engine-side mount 120, and the end of the shaft 137 is mechanically attached to the cowl 130 at a body-side mount 125. When attached in the illustrated or similar manner, the potentiometer 135 provides a displacement signal output that reflects the displacement of the engine 110 with respect to the body of the vehicle 115. That is, the voltage change of the potentiometer 135 output corresponds to the movement of the shaft 137. In this respect, the potentiometer 135 can be a displacement measuring device configured to observe engine block movement relative to the cowl 130. As used herein, the engine block refers to the body or structure of the engine 110 in contrast to other externally visible moving parts of the engine 110, such as a belt pulley.

The engine-side mount 120 and the body-side mount 125 are attachment points for the potentiometer 135. The engine-side mount 120 and body-side mount 125 can be located at any suitable location on the engine 110 and the vehicle 115. One skilled in the art will appreciate that the location of the engine-side mount 120 and the body-side mount 125 can vary depending on the make and model of the vehicle 115 or other equipment under test. For example, in a 1989 Ford Taurus (3.0 liter, V-6 engine), the engine-side mount 120 is a bracket that is located near the throttle body and the body-side mount 125 is a location on the cowl 130 that arranges the potentiometer 135 parallel to the thrust line of the vehicle 115. Further, one skilled in the art will appreciate that the body-side mount 125 need not be coupled to the vehicle 115. That is, the body-side mount 125 may be a stationary structure external to the vehicle 115.

A suitable measurement or attachment point on the engine 110 is a point that has engine block motion. In one embodiment, a technician uses trial-and-error techniques to find a convenient point that has engine block motion in at least one dimension. For example, in a transverse mounted V-6 engine arrangement, the engine 110 likely has maximum movement in a direction that is parallel to the thrust line of the vehicle 115. For a transverse mounted in-line engine, however, the engine 110 likely has maximum movement in a direction that is perpendicular to the thrust line of the vehicle 115. As one skilled in the art will appreciate, engine block movement can depend on the number and placement of the engine mounts. Although motor mounts can restrict movement in certain directions, the movement can be manifested in other directions.

In one embodiment, the signal analyzer 150 provides specific information regarding measurement points or provides additional heuristics to assist the technician in configuring the displacement measuring device. Additional details about the placement of the displacement measuring device (e.g., the potentiometer 135) are described below and with reference to FIG. 4.

Figure 1B:
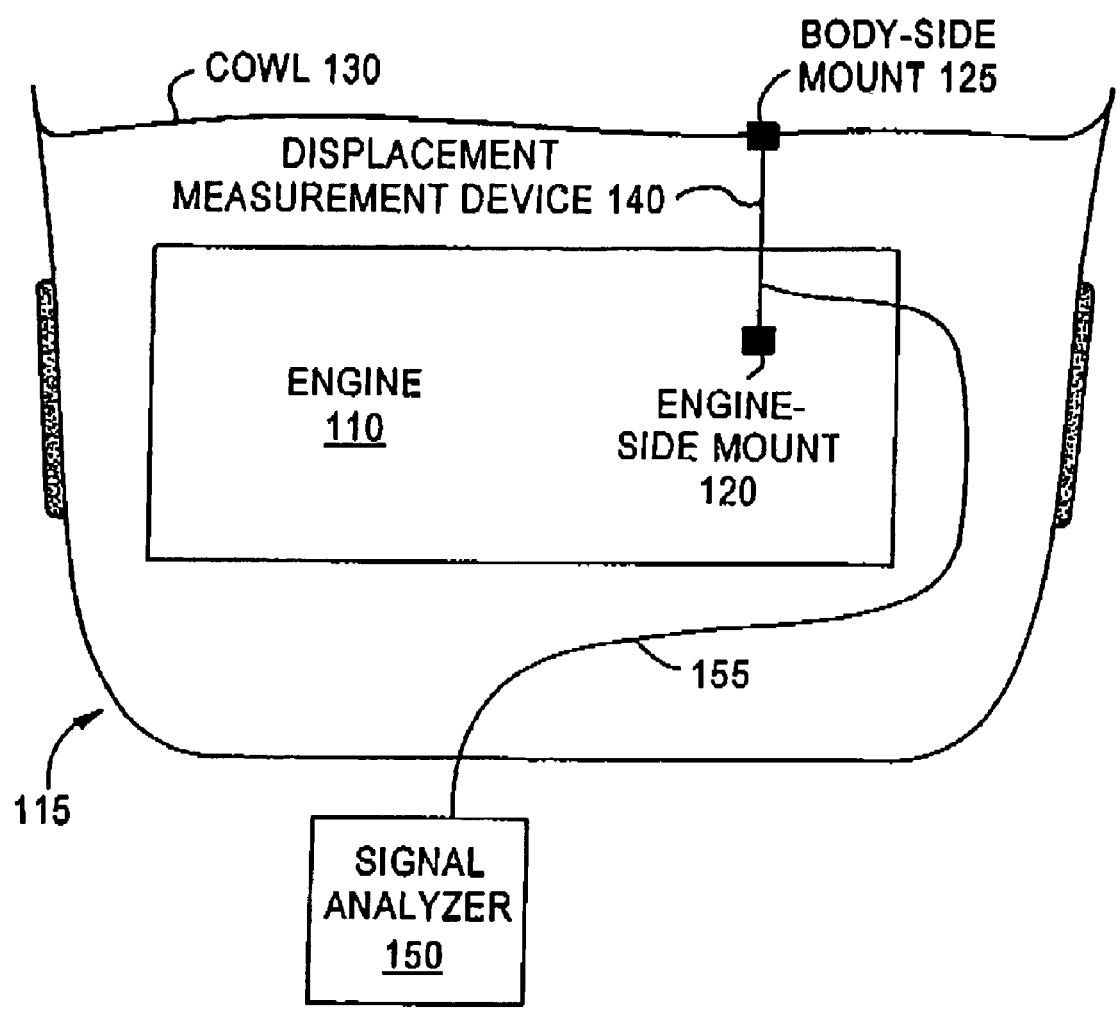
FIG. 1B illustrates on operating environment for an embodiment of the present disclosure.

The embodiment shown in FIG. 1B includes a displacement measurement device 140 operatively coupled to the signal analyzer 150. The displacement measurement device 140 is configured to detect engine block movement relative to a stationary structure, such as the cowl 130. As described above, the cowl 130 is part of the body of the vehicle 115 and represents a stationary or fixed mount point with respect to movement (or displacement) of the engine 110.

Figure 2:
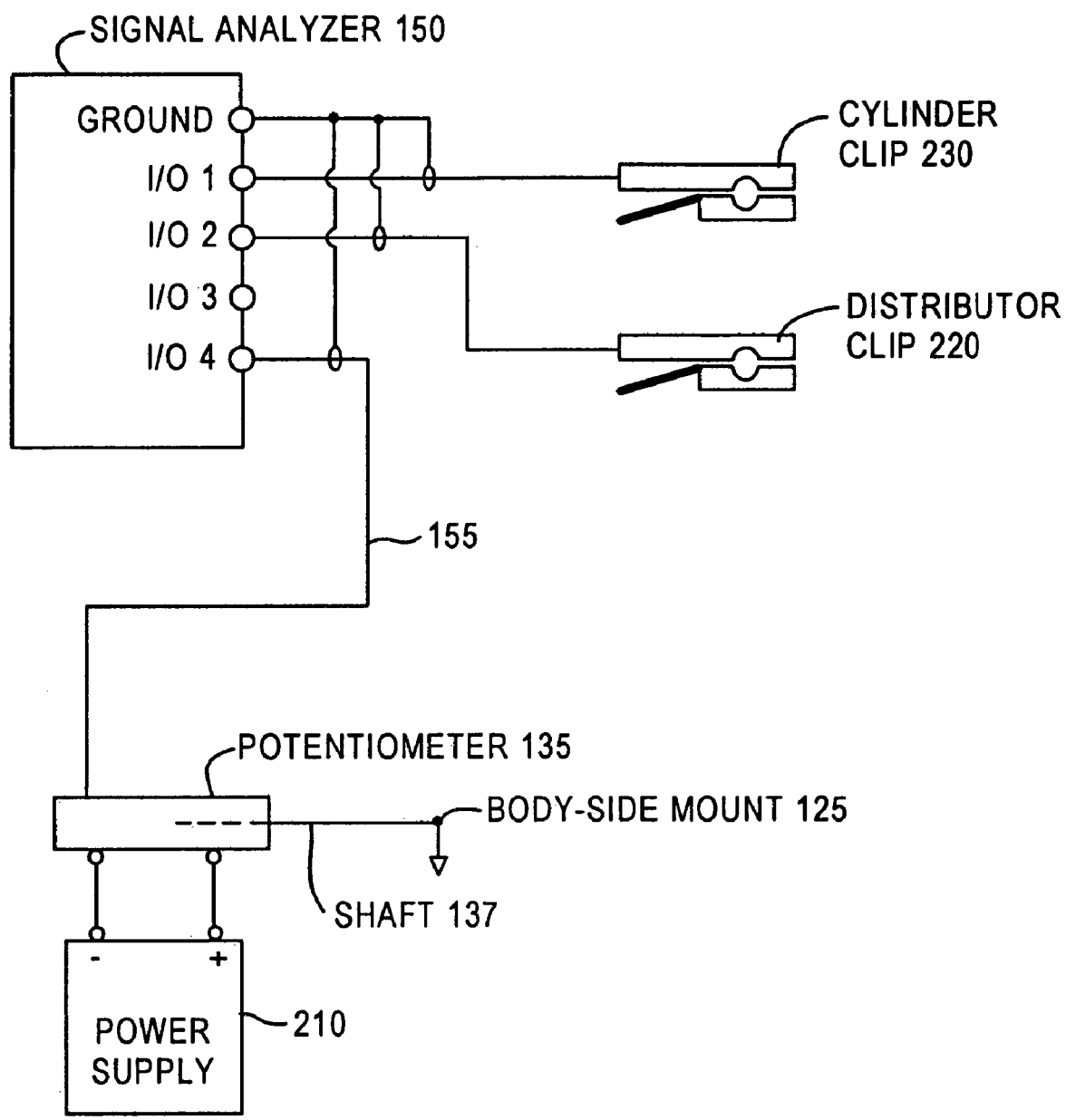
FIG. 2 is a diagram illustrating an exemplary configuration of an embodiment of the present disclosure.

FIG. 2 is a diagram illustrating an exemplary configuration of an embodiment of the present disclosure. The illustrated embodiment includes the potentiometer 135, the signal analyzer 150, a power supply 210, a distributor clip 220, and a cylinder clip 230. The signal analyzer 150 can include one or more input/output ports. In one embodiment, the input/output (I/O) ports function as oscilloscope channels for receiving electrical signals.

In one embodiment, the cylinder clip 230 is coupled to the spark plug wire of a reference cylinder. More specifically, the cylinder clip 230 can be fastened or attached to the spark plug wire for the first cylinder in the firing order of the engine 110. The cylinder clip 230 provides an output signal that is coupled to I/O port 1 of the signal analyzer 150. The cylinder clip 230 also provides a grounding lead that is coupled to the ground port of the signal analyzer 150. The output signal represents a trigger signal that is used to start data acquisition or otherwise indicate to the signal analyzer 150 when a particular cylinder has fired. The trigger signal is further described below and with reference to FIG. 5.

One skilled in the art will appreciate that the cylinder clip 230 can be coupled to the engine 110 in a variety of ways that can depend on the type of ignition system used by the engine 110. That is, various capacitive or inductive signal sensing techniques can be used, such as coil-on-plug (COP) adapters, hybrid COP adapters, RPM clamps or KV clips.

The distributor clip 220 can be coupled to the distributor in order to sample the ignition coil voltage at the distributor rate. With a 6 cylinder engine, for example, the distributor clip 220 provides an output signal that is coupled to I/O port 2 of the signal analyzer 150 to indicate the six firings. The distributor clip 220 also provides a grounding lead that is coupled to the ground port of the signal analyzer 150. Similar to the cylinder clip 230, distributor clip 220 can use any suitable coupling technique, such as inductive, capacitive or resistive.

The power supply 210 couples to and provides power for the potentiometer 135. In one embodiment, the power supply 210 provides a 30 volt, direct current (VDC) supply to the potentiometer 135. Of course, the voltage or the current provided by the power supply 210 to the potentiometer 135 or other displacement measuring device may be adjusted to suit various system configurations. The potentiometer 135 generates a displacement signal that is proportional to the motion of the engine 110. In some configurations, the proportionality of movement of the shaft 137 to the displacement signal is dependent on the supply voltage from the power supply 210. That is, the maximum peak-to-peak amplitude of the displacement signal may depend upon the supply voltage.

As described above, the potentiometer 135 provides a displacement signal via the signal cable 155. In the illustrated embodiment, the signal cable 155 is coupled to I/O port 4 of the signal analyzer 150. The signal cable 155 may further include a grounding lead that is coupled to the ground port of the signal analyzer 150. This permits a common ground or reference potential for each of the distributor clip 220, cylinder clip 230, and potentiometer 135.

1. Engine Displacement Measurement

In a reciprocating engine, a lack of equal contribution from each cylinder tends to produce an unwanted engine block motion. That is, the lack of expected contribution from one or more cylinders can cause the engine to "rock" or displace with respect to the engine's normal, balanced motion on its mount points. Embodiments of the present disclosure evaluate engine cylinder contribution by measuring the amount of engine block motion.

As one skilled in the art will recognize, the potentiometer 135 represents one technique for measuring the engine block motion directly. In another embodiment, a piezo cable can be used to measure the engine block motion. A piezo cable (such as one commercially available from Measurement Specialties, Valley Forge, Pa.) is a coaxial cable, which when stretched axially, outputs a voltage that is proportional to strain. Strain is defined in Equation 1, where $\Delta L$ is the change in cable length, $L_0$ is the original length. The voltage developed between the center conductor and the cable shield is defined, for example, in Equation 2, where K is a constant of proportionality.

$$\text{Strain} = \frac{\Delta L}{L_0} \quad (1)$$

$$V = K * \text{Strain} \quad (2)$$

One advantage of using a piezo cable as a displacement measuring device is that the piezo cable can be directly coupled to the signal analyzer 150. Therefore, in this embodiment, the potentiometer 135 and the power supply 210 are not used.

In a further embodiment, an antenna or antennas and an associated signal receiver can be used to measure engine block motion. The receiver can detect a signal from each spark plug firing and provide an output signal to the signal analyzer 150. The signal analyzer 150 can then measure the time difference for any two cylinders (in the proper firing order). A time difference can indicate that the engine has slowed during the interval between firings. The signal analyzer 150 can identify which cylinder has a contribution problem that caused the slowing.

Additionally, a laser or other optical encoding device can be used to measure engine block movement directly. The laser can be coupled to the engine 110 or the vehicle 115. In this embodiment, the laser generates a displacement signal output that is provided to the signal analyzer 150.

In an embodiment, a machine vision device can be used to measure engine block movements. A target can be placed on the engine block and the machine vision device can track the movements of the target. Based on the detected movements, the machine vision device can provide a displacement signal output for the signal analyzer 150 or provide coordinate information, such as motion vectors that can be used for analysis. In one embodiment, the target comprises masked circles made from retroreflective material. The machine vision device can analyze angular or positional changes to measure engine block movements. Further, a machine vision device can be configured to discriminate the engine block from other components of the vehicle 115 to detect engine block displacement without an express target.

Additionally, a vibration or sound sensing device may be used to measure engine block movements. In this embodiment, a signal filter may be needed to distinguish between desirable and undesirable motion. More specifically, an engine-specific filter can be used to discriminate between normal motion and motion that is due to a cylinder contribution problem. The vibration or sound sensing device can generate a displacement signal output that is provided to the signal analyzer 150.

Similar to the potentiometer 135, a cable having resistance proportional to strain can be used to measure engine block motion. At a given temperature, stretching a cable can cause a change in end-to-end resistance as defined in Equation 3, where K is a constant of proportionality.

$$\Delta R = K * \text{Strain} \quad (3)$$

In this embodiment, the power supply 210 provides a voltage across the cable. The displacement signal provided to the signal analyzer 150 reflects a voltage change that corresponds to the change in cable resistance.

B. Signal Analyzer

Figure 3:
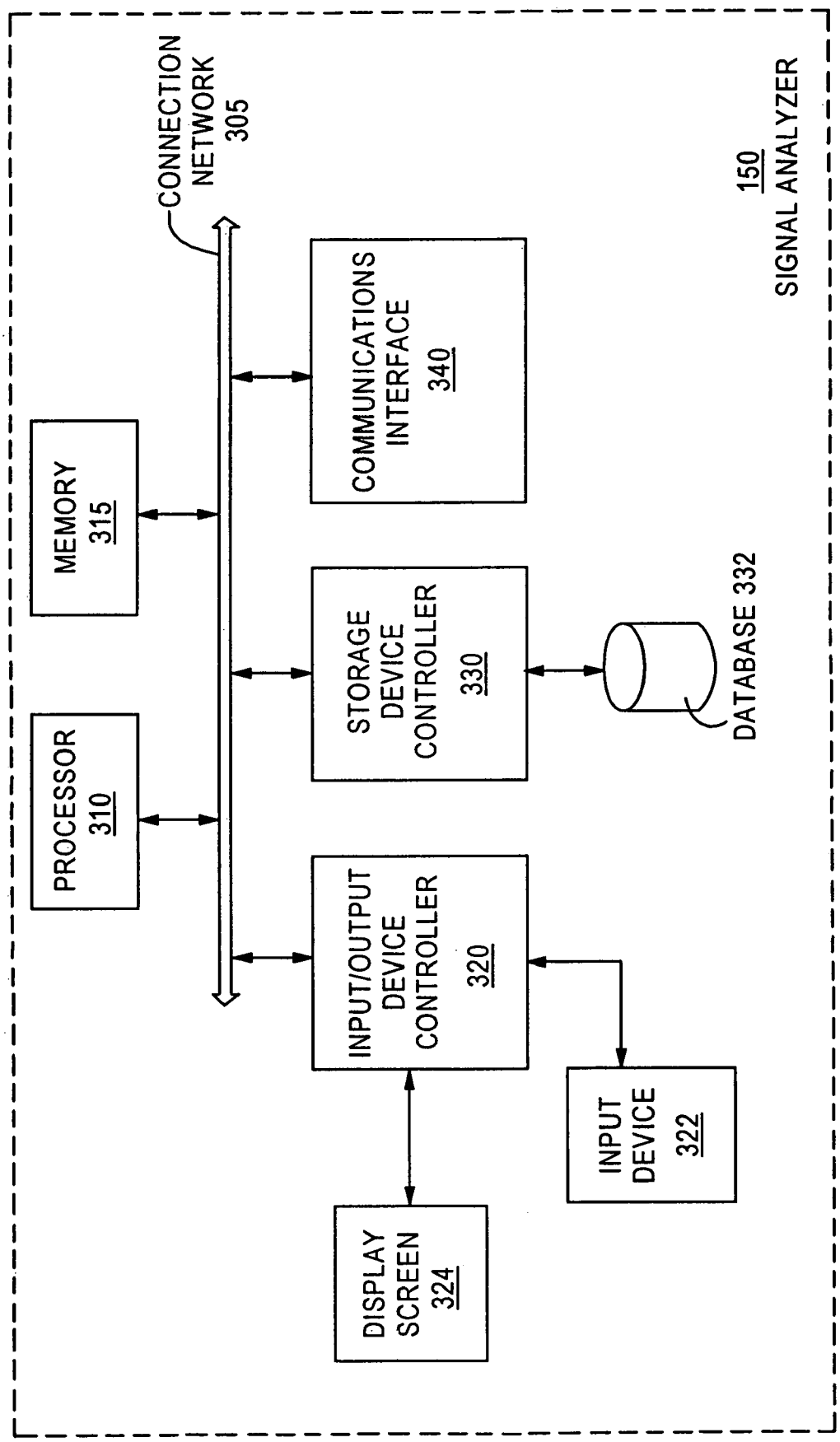
FIG. 3 is a block diagram of a signal analyzer according to an embodiment of the present disclosure.

FIG. 3 is a block diagram of a signal analyzer according to an embodiment of the present disclosure. In the illustrated embodiment, the signal analyzer 150 is a computing device with suitable signal inputs or interfaces. The signal analyzer 150 includes a connection network 305, a processor 310, a memory 315, an input/output device controller 320, an input device 322, a display screen 324, a storage device controller 330, a database 332, and a communications interface 340.

The connection network 305 operatively couples each of the processor 310, the memory 315, the input/output device controller 320, the storage device controller 330, and the communications interface 340. The connection network 305 can be an electrical bus, switch fabric, or other suitable interconnection system.

The processor 310 is a conventional microprocessor. In one embodiment, the signal analyzer 150 is portable and powered by a battery. In this instance, the processor 310 may be designed for low power operation in order to provide satisfactory runtime before requiring recharging or replacement of the battery. In a typical service facility, satisfactory runtime is approximately 8 hours or the duration of a technician's shift.

The processor 310 executes instructions or program code modules from the memory 315. The operation of the signal analyzer 150 is programmable and configured by the program code modules. Such instructions may be read into memory 315 from another computer readable medium, such as a device coupled to the storage device controller 330. Execution of the sequences of instructions contained in the memory 315 causes the processor 310 to perform the method or functions described herein. In alternative embodiments, hardwired circuitry may be used in place of or in combination with software instructions to implement aspects of the disclosure. Thus, embodiments of the disclosure are not limited to any specific combination of hardware circuitry and software. The memory 315 can be, for example, one or more random access memory (RAM) devices, flash RAM, or electronically erasable programmable read only memory (EEPROM) devices. The memory 315 may also be used for storing temporary variables or other intermediate information during execution of instructions by processor 310.

The term "computer readable medium" as used herein refers to any medium that participates in providing instructions to the processor 310 for execution. Such a medium may take many forms, including but not limited to, non-volatile media, volatile media, and transmission media. Non-volatile media includes, for example, optical or magnetic disks, such as those controlled by the storage device controller 330. Volatile media includes dynamic memory, such as the memory 315. Transmission media includes coaxial cables, copper wire and fiber optics, including the wires or communication paths that comprise the connection network 305. Transmission media can also take the form of acoustic or light waves, such as those generated during radio wave and infrared data communications.

Common forms of computer readable media include, for example, a floppy disk, a flexible disk, hard disk, magnetic tape, or any other magnetic medium, a CD-ROM, any other optical medium, punch cards, paper tape, any other physical medium with patterns of holes, a RAM, a programmable ROM (PROM), an electrically PROM (EPROM), a flash EPROM, any other memory chip or cartridge, a carrier wave, or any other medium from which a data processing system can read.

Various forms of computer readable media may be involved in carrying one or more sequences of one or more instructions to the processor 310 for execution. For example, the instructions may initially be carried on a magnetic disk of a remote data processing system, such as a server. The remote data processing system can load the instructions into its dynamic memory and send the instructions over a communication link. The communications interface 340 can receive the data from the communication link and place the data on the connection network 305. The connection network 305 can then carry the data to the processor 310 for execution.

The input/output device controller 320 provides an interface to the display screen 324 and the input device 322. The display screen 324 can include associated hardware, software, or other devices that are needed to generate a screen display. In one embodiment, the display screen 324 is a conventional liquid crystal display (LCD). One skilled in the art will appreciate that many suitable technologies can be used for the display screen 324, for example, a light emitting diode (LED), organic LED, cathode ray tube (CRT), or a plasma display panel (PDP). The display screen 324 may also include touch screen capabilities.

The illustrated embodiment also includes an input device 322 operatively coupled to the input/output device controller 320. The input device 322 can be, for example, an external or integrated keyboard or cursor control pad. In an automotive service environment, for example, it may be convenient for a technician to enter customer or vehicle information using the input device 322. Of course, customer or vehicle information can also be transmitted to the signal analyzer 150 by another device such as a server (not illustrated). In one embodiment, the communications interface 340 can receive such information and can send the information to the processor 310 via the connection network 305.

The storage device controller 330 can be used to interface the processor 310 to various memory or storage devices. In the illustrated embodiment, a database 332 is shown for storing customer information, test results, system configuration, engine parameters, and the like. As one skilled in the art will appreciate, the database 332 can be implemented on any suitable storage medium, such as magnetic, optical, or electrical storage. Additionally, the database 332 may store and retrieve information that is used by one or more of the functional modules described below and with reference to FIG. 4.

The communications interface 340 provides bidirectional data communication coupling for the signal analyzer 150. In one embodiment, the communications interface 340 provides one or more input/output ports for receiving electrical, radio frequency, or optical signals and converts signals received on the port(s) to a format suitable for transmission on the connection network 305. For example, the communications interface 340 may include a plurality of analog-to-digital (A/D) converters or other logic for sampling input signals.

1. Program Code Modules

Figure 4:
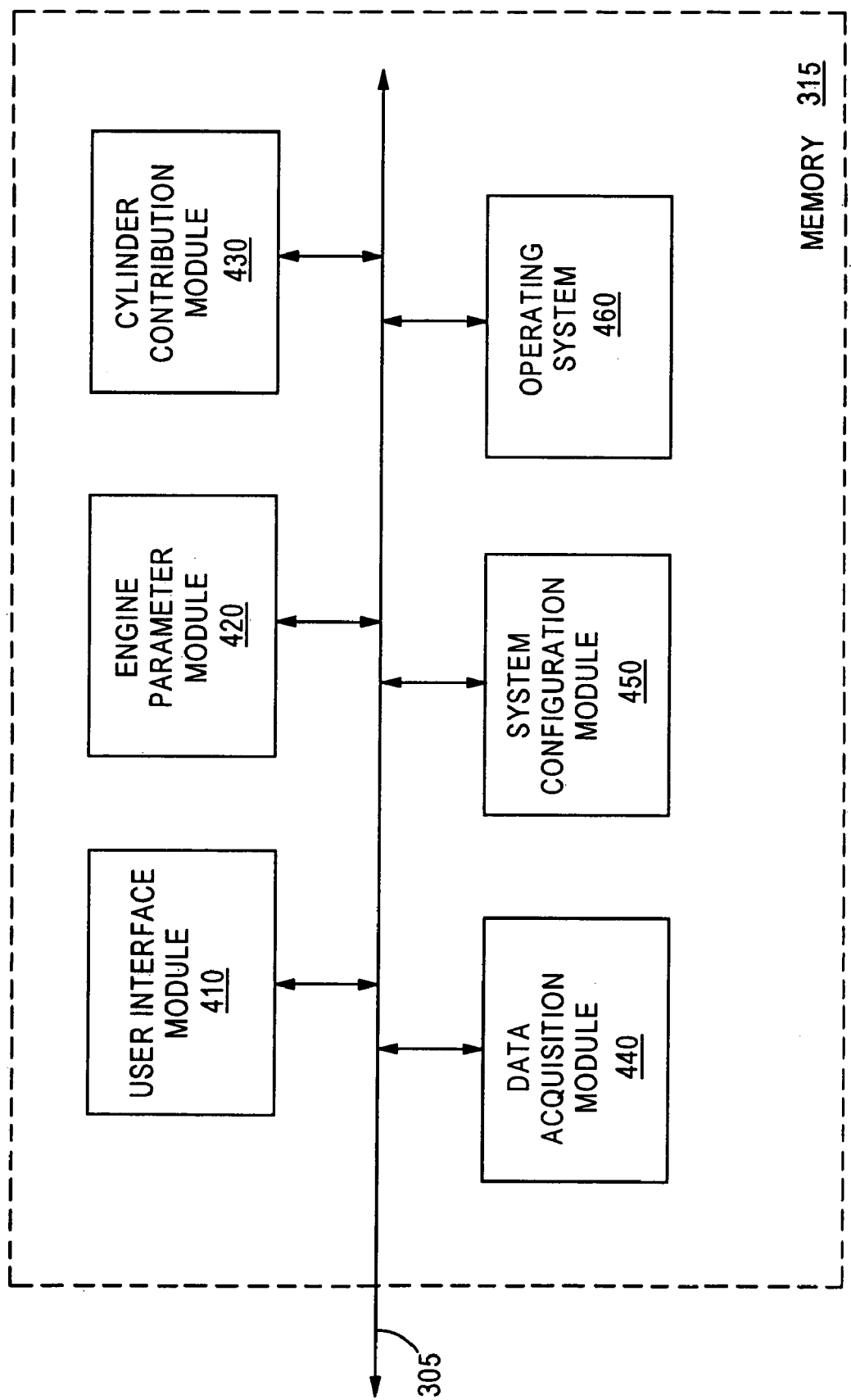
FIG. 4 illustrates program code modules for an embodiment of the present disclosure.

FIG. 4 illustrates program code modules for an embodiment of the present disclosure. The illustrated embodiment includes a user interface module 410, an engine parameter module 420, a cylinder contribution module 430, a data acquisition module 440, a system configuration module 450, and an operating system module 460. The connection network 305 communicatively couples each of the modules 410, 420, 430, 440, 450, 460.

The modules 410, 420, 430, 440, 450, 460 include program instructions that can be executed on, for example, the processor 310 to implement the features or functions of the present disclosure. The modules 410, 420, 430, 440, 450, 460 are typically stored in a memory, such as the memory 315. As described above, the program instructions can be distributed on a computer readable medium or storage volume. The computer readable storage volume can be available via a public network, a private network, or the Internet. Program instructions can be in any appropriate form, such as source code, object code, or scripting code. One skilled in the art will recognize that arrangement of the modules 410, 420, 430, 440, 450, 460 represents one example of how the features or functionality of the present disclosure can be implemented.

The user interface module 410 includes display elements that can be presented on the display screen 324. As described in further detail below and with reference to FIG. 6, the user interface module 410 can generate screen displays of waveform data, test results and the like.

The engine parameter module 420 provides information about the engine 110 under evaluation. The engine parameter module 420 can receive information about the engine 110 from, for example, the user interface module 410 or from the database 332. The engine parameter module 420 provides data, such as engine mass, mounting characteristics, and firing order that the signal analyzer 150 uses for evaluating cylinder contribution.

The engine parameter module 420 may further provide information to assist the technician in placing the displacement measurement device in an appropriate location on the engine 110. As one skilled in the art will appreciate, an appropriate position is one that manifests engine block movement when a cylinder is poorly contributing.

The cylinder contribution module 430 evaluates engine block movement to determine cylinder contribution. The cylinder contribution module 430 receives displacement information from the data acquisition module 440. In one embodiment, the cylinder contribution module 430 computes one or more derivatives of the displacement signal in order to identify inflection points in the engine block movement. The cylinder contribution module 430 can further compensate for engine mass or other signal dampening characteristics in order to identify a poorly contributing cylinder from the displacement signal.

The data acquisition module 440 includes functionality for storing and for retrieving data received from the communications interface 340. When performing a test, for example, the communications interface 340 may provide a raw data stream of the measurements which the database module records. Accordingly, the data acquisition module 340 can provide measurement data to the processor 210 or other functional modules for analysis.

The system configuration module 450 handles the configuration of the signal analyzer 150. A user of the signal analyzer 150 may select among various configuration options. For example, the user may indicate the type of displacement measuring device that is coupled to the signal analyzer 150. Additionally, the user may indicate the location on the engine 110 where the displacement measuring device is coupled. In an embodiment, the cylinder contribution module 430 uses configuration information, in conjunction with the engine parameter module 420, to enhance the accuracy of the test results.

The operating system module 460 represents a conventional operating system for a handheld or embedded device, such as Microsoft Windows CE (which is commercially available from Microsoft Corp., Redmond, Wash.). The operating system module 460 provides an application programming interface (API) through which the modules 410, 420, 430, 440, 450 or other application programs interact with the signal analyzer 150. For example, the user interface module 410 calls a function of the operating system module 460 in order to display an element on the display screen 324.

2. Test Results

Figure 5:
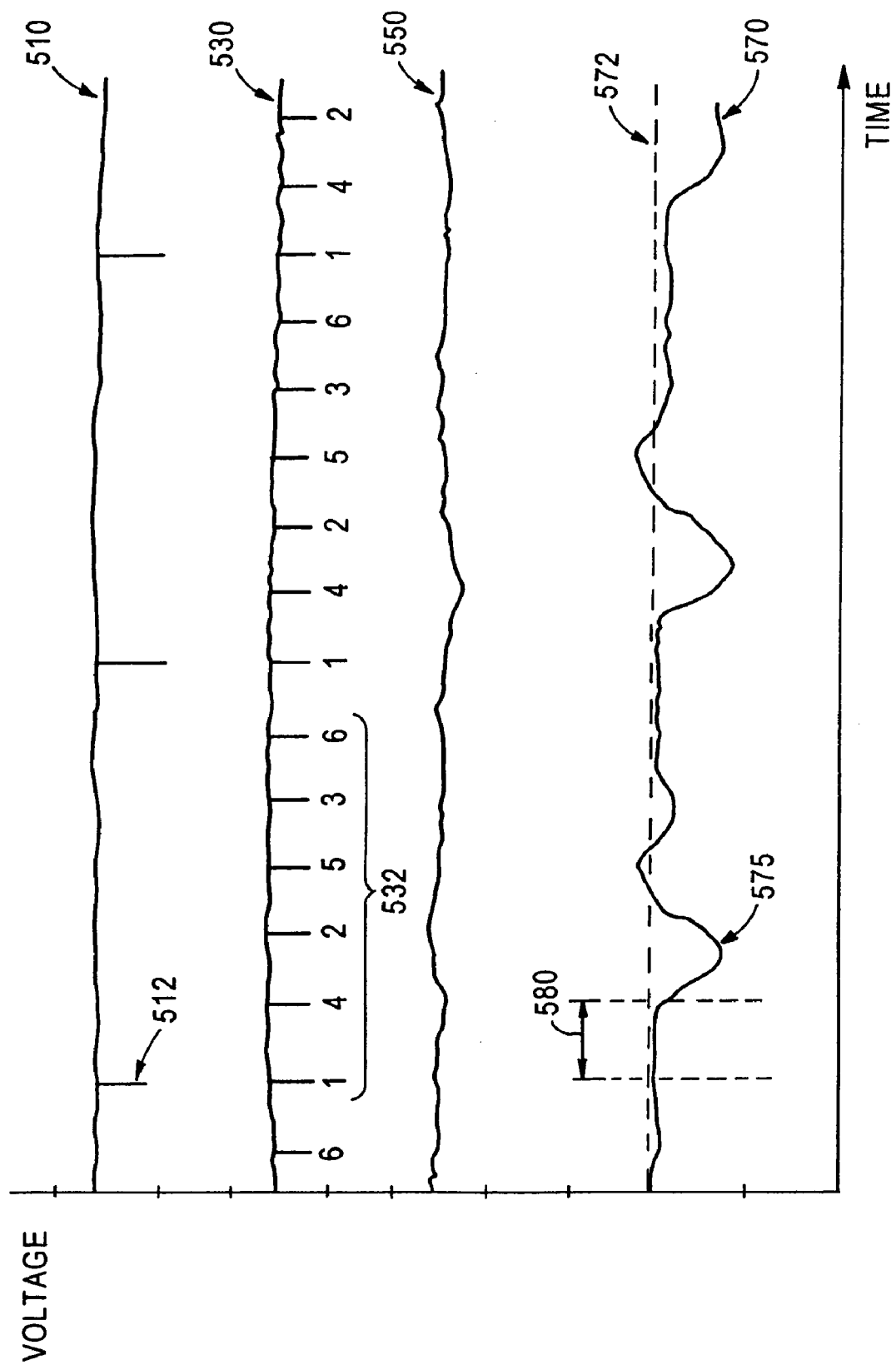
FIG. 5 illustrates signal waveforms according to an embodiment of the present disclosure.

FIG. 5 illustrates signal waveforms according to an embodiment of the present disclosure. The illustrated embodiment includes a trigger signal 510, a marker signal 530, a normal displacement signal 550, and a poorly contributing cylinder displacement signal 570.

The trigger signal 510 indicates the firing of a first cylinder. Typically the trigger signal 510 is associated with the cylinder no. 1 or the first cylinder in the firing order of the engine 110. Of course, the trigger signal 510 can be associated with the firing of any of the engine cylinders provided that the signal analyzer 150 (or the technician) has information about the firing order of the engine 110. The trigger signal 510 is used to provide a reference signal to the signal analyzer 150 for data acquisition or analysis purposes. More specifically, when the signal analyzer 150 receives a first cylinder trigger 512, it can determine the time points at which the other cylinders intend to fire given the timing and firing order for the engine 110. Although testing is typically performed at idle speed (e.g., 600 to 1200 RPM), the signal analyzer 150 is responsive to changes in the period of the trigger signal 510 or other signals.

The marker signal 530 indicates the firings of each of the cylinders from trigger-to-trigger. In one embodiment, the marker signal 530 is provided by the output of the distributor clip 220. The signal analyzer 150 can superimpose or overlay numbers that indicate the firing order 532 in order to aid a technician's understanding of the signal waveforms. In the illustrated embodiment, six firings are shown where each firing corresponds to one of the six engine cylinders. One skilled in the art will appreciate that if the engine 110 includes greater or fewer cylinders then greater or fewer firings are shown accordingly.

The normal displacement signal 550 shows a small amount of engine block motion that is associated with normal, balanced operation of the engine 110. In this case, each cylinder of the engine 110 is contributing approximately equally to the total power output. Specifically, if the peak-to-peak amplitude of the displacement signal is the same or zero for all cylinders, then all cylinders are contributing equally to the total power output.

On the other hand, the poorly contributing cylinder displacement signal 570 indicates a contribution problem with one of the cylinders. When a cylinder fails to contribute equally, the motion of the engine 110 responds to this lack of a single power stroke, slows slightly, and moves accordingly. Specifically, if a particular cylinder is contributing less than the average of the other cylinders, the peak-to-peak amplitude for that cylinder is higher because of the engine rock created.

In the illustrated embodiment, the poorly contributing cylinder displacement signal 570 includes peaks above and below a bias point 572. When a particular cylinder poorly contributes, the engine 110 typically moves when the next cylinder fires. That is, the normal contribution of the next cylinder reveals the imbalanced operation.

In the illustrated example, cylinder number 1 is poorly contributing to total output power. A time period 580 elapses before corresponding engine block movement occurs. The time period 580 generally relates to the time between cylinder firings. Although the signal analyzer 150 (or technician) observes a negative going peak 575 between the firings of cylinders 4 and 2, the movement is due to poor contribution from cylinder 1. In addition, because of mass, engine mounts, or other dampening characteristics, the engine 110 does not instantaneously move when a cylinder fails or poorly contributes. The signal analyzer 150 can compensate for the time period 580 and other characteristics in order to evaluate cylinder contributions accurately. In one embodiment, the signal analyzer 150 uses engine-specific information, such as the type of engine mounts, to evaluate the dampening of the displacement signal.

Figure 6:
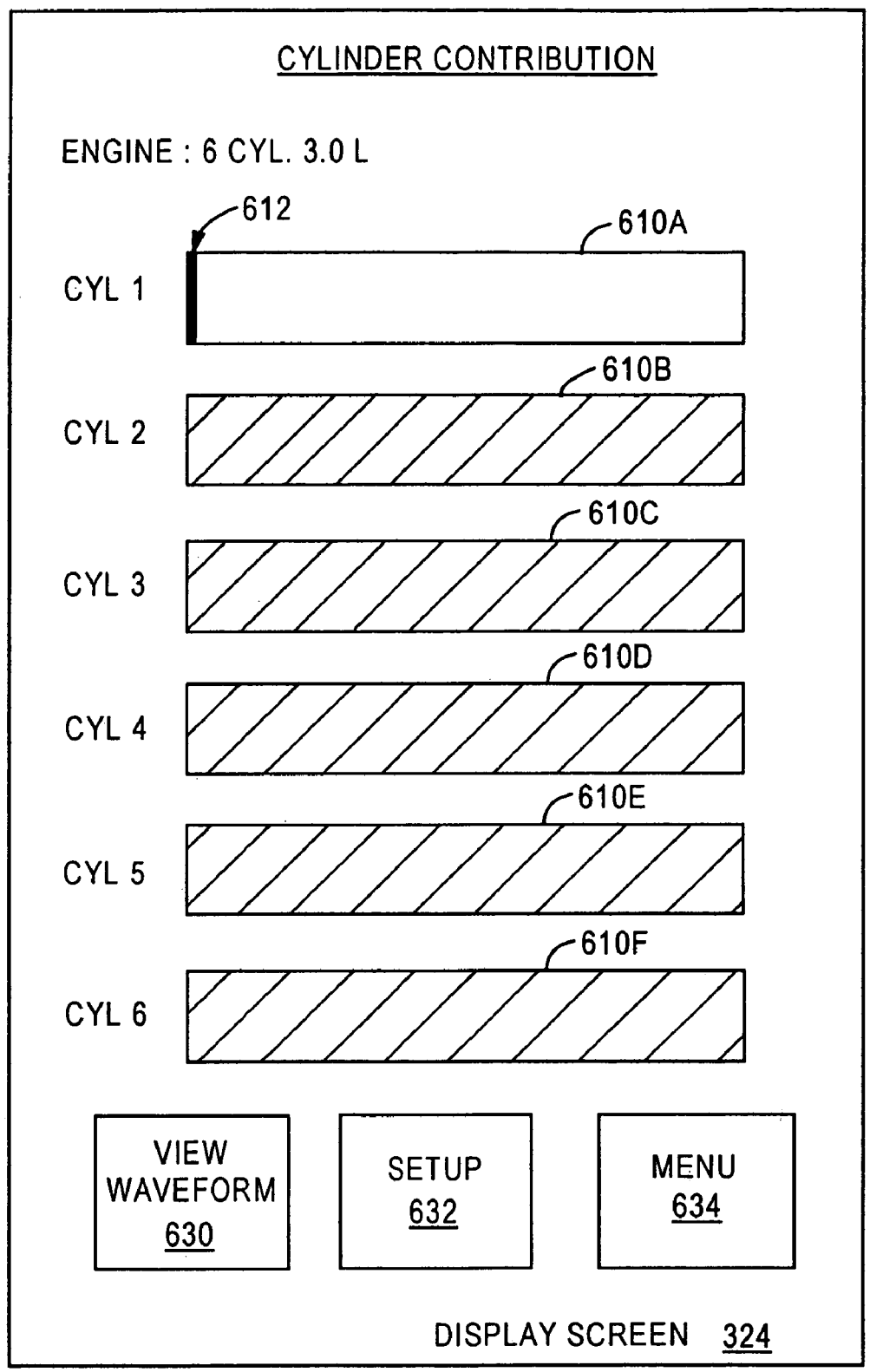
FIG. 6 is a diagram illustrating a user interface according to an embodiment of the present disclosure.

FIG. 6 is a diagram illustrating a user interface according to an embodiment of the present disclosure. The illustrated user interface includes several display elements shown on the display screen 324. The user interface displays the cylinder contribution for each cylinder of a six cylinder engine. These contributions are illustrated as bar graphs 610A–F. In the illustrated example, cylinders 2 through 6 are contributing normally as indicated by full bars 610B–F. Cylinder 1, however, has low or no contribution as indicated by point 612 on bar graph 610A.

Although many different types of digital or analog displays can be used, one advantage of the bar graphs 610A–F is that a technician can quickly see the relative contributions of each of the cylinders. Of course, in one embodiment, the user interface can state that a particular cylinder is a poor contributor. The technician can then focus his or her repair on that cylinder.

Problem conditions that can cause poor or no cylinder contribution include: valve leak, bad head gasket, manifold leak, shorted or fouled spark plug gap, open plug or wire, bad or broken ring(s), and faulty fuel injector. One advantage of directly measuring the amount of engine block movement using, e.g., the potentiometer 135, is the precision of the displacement signal obtained. Different problem conditions can produce different amounts of characteristic engine block motion. In one embodiment, the signal analyzer 150 can further refine the test result information to include one or more likely problem conditions of the poorly contributing cylinder.

The user interface illustrated in FIG. 6 also includes a view waveform option 630, a setup option 632, and a menu option 634. The user can invoke or select the view waveform option 630 to display the displacement signal or other waveforms. In this case, the signal analyzer 150 displays waveforms similar to those illustrated in FIG. 5. One skilled in the art will appreciate that the signal analyzer 150 can displace the firing order 532 by a predetermined amount and overlay the firing order 532 on the displacement signal 550, 570. Displaying the firing order 532 has an advantage of making the waveform display easier for the technician to understand.

The setup option 632 can be used to configure the signal analyzer 150 or to enter customer information. In one embodiment, the setup option 632 enables the technician to enter the vehicle identification number (VIN) for the vehicle 115. The signal analyzer 150 can then use the VIN to lookup engine parameters, such as mass, firing order, and position information for the displacement measurement device.

The menu option 634 enables the technician to return to a menu of diagnostic tests or other options for operating the signal analyzer 150. The signal analyzer 150 may also provide other diagnostic functions or be coupled to other sources of diagnostic information that can be accessed via a navigational menu.

C. Method for Cylinder Contribution Measurement

Figure 7:
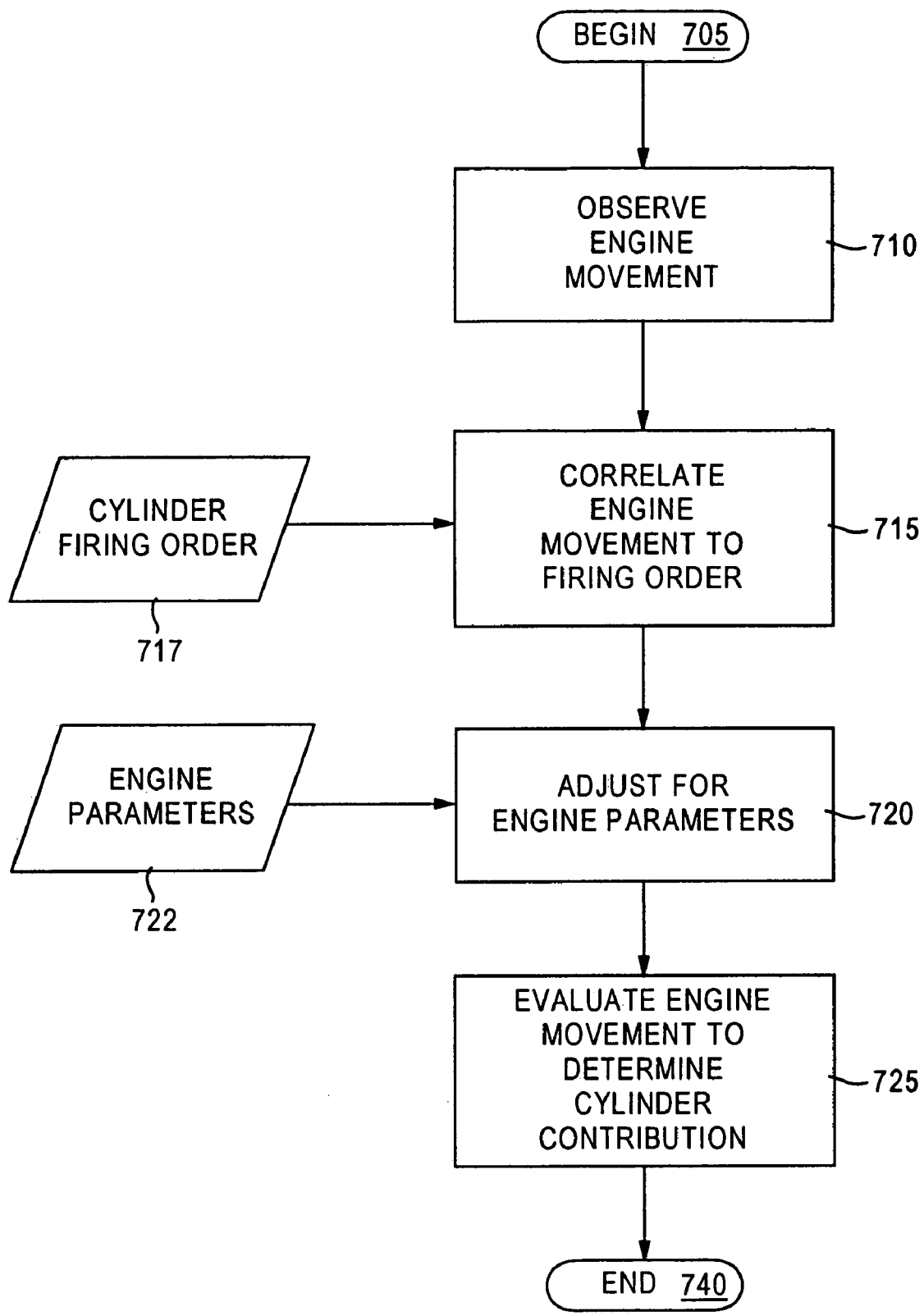
FIG. 7 is a flowchart illustrating a method for measuring cylinder contribution according to an embodiment of the present disclosure.

FIG. 7 is a flowchart illustrating a method for measuring cylinder contribution according to an embodiment of the present disclosure. The illustrated method begins 705 by observing 710 engine block movement. As described in further detail above, the data acquisition module 440 receives a displacement signal from the displacement measuring device (e.g., the potentiometer 135).

The method then correlates 715 engine block movement to firing order. The firing order is provided 717 in order to correlate 715. In one embodiment, the method compensates for the time period 580 before associating engine block movement with a particular engine cylinder. As described in further detail above, the trigger signal 510 provides a reference that can be used to identify conclusively a poorly contributing cylinder.

Next, the method adjusts 720 for engine parameters 722. The engine parameters 722 indicate engine-specific characteristics such as the mass and type of engine mounting (e.g., electronic dampening or rubber mounts). The engine parameters 722 can influence the engine block motion that results from a poorly contributing cylinder.

The method then evaluates 725 the engine block movement to determine cylinder contribution. In one embodiment, the signal analyzer 150 finds the inflection points of the displacement signal by analyzing the derivative of the displacement signal. The correlation 715 to the firing order illustrates which cylinder is causing engine block motion and consequentially poor contributing to the total output power of the engine 110. In one embodiment, the evaluation 725 identifies the relative contributions for each of the cylinders.

After the engine block movement is evaluated 725, the measurement method ends 740 and results may be displayed on the display screen 324 or stored in the memory 315 or the database 332 for subsequent use.

Having described embodiments of reciprocating engine cylinder contribution tester and method (which are intended to be illustrative and not limiting), it is noted that modifications and variations can be made by persons skilled in the art in light of the above teachings. It is therefore to be understood that changes may be made in the particular embodiments disclosed that are within the scope and spirit of the disclosure as defined by the appended claims and equivalents.

What is claimed is:

1. A system for evaluating engine cylinder contribution comprising:
    a displacement measurement device configured to detect engine block movement relative to a stationary structure; and
    a signal analyzer coupled to the displacement measurement device and configured to evaluate the engine block movement for determining engine cylinder contribution,
    wherein the displacement measurement device comprises a potentiometer having a shaft with a first end and a second end, wherein the first end is attached to the engine block and the second end is attached to the stationary structure.

2. A system for evaluating engine cylinder contribution comprising:
    a displacement measurement device configured to detect engine block movement relative to a stationary structure; and
    a signal analyzer coupled to the displacement measurement device and configured to evaluate the engine block movement for determining engine cylinder contribution, wherein the displacement measurement device comprises a machine vision device.

3. A method for measuring cylinder contribution for an engine having a firing order, the method comprising the steps of:

implementing a displacement measuring device for detecting engine block movement relative to a stationary structure;
correlating the engine block movement to the firing order; and
evaluating, for at least one engine cylinder, the engine block movement; and further comprising:
attaching a first end of the displacement measuring device to the engine block; and
attaching a second end of the displacement measuring device to the stationary structure.

4. A method for measuring cylinder contribution for an engine having a firing order, the method comprising the steps of:

implementing a displacement measuring device for detecting engine block movement relative to a stationary structure;
correlating the engine block movement to the firing order; and
evaluating, for at least one engine cylinder, the engine block movement; wherein the evaluating step further comprises:
determining a cylinder contribution from the engine block movement; and
the determining step includes computing a derivative of the engine block movement.

* * * * *